(12) United States Patent
Jackson et al.

(10) Patent No.: US 12,391,622 B2
(45) Date of Patent: Aug. 19, 2025

(54) MICROSTRUCTURED FIBER INTERFACE COATINGS FOR COMPOSITES

(71) Applicant: RTX Corporation, Farmington, CT (US)

(72) Inventors: Richard Wesley Jackson, Mystic, CT (US); Ying She, East Hartford, CT (US); Gajawalli V. Srinivasan, South Windsor, CT (US)

(73) Assignee: RTX CORPORATION, Farmington, CT (US)

( * ) Notice: Subject to any disclaimer, the term of this patent is extended or adjusted under 35 U.S.C. 154(b) by 1009 days.

(21) Appl. No.: 16/678,833

(22) Filed: Nov. 8, 2019

(65) Prior Publication Data

US 2021/0139384 A1    May 13, 2021

(51) Int. Cl.
| | | |
|---|---|---|
| C04B 35/80 | (2006.01) | |
| C04B 35/01 | (2006.01) | |
| C04B 35/622 | (2006.01) | |
| C04B 41/50 | (2006.01) | |

(52) U.S. Cl.
CPC .... *C04B 41/5042* (2013.01); *C04B 35/62236* (2013.01); *C04B 35/62281* (2013.01)

(58) Field of Classification Search
CPC .... C04B 2235/5224; C04B 2235/5228; C04B 2235/524; C04B 2235/5244; C04B 2235/5248; C04B 2235/6567; C04B 2235/76; C04B 2235/765; C04B 35/117; C04B 35/185; C04B 35/195; C04B 35/565; C04B 35/62236; C04B 35/62281; C04B 35/62855; C04B 35/62857; C04B 35/62863; C04B 35/62876; C04B 35/62884; C04B 35/62894; C04B 35/62897; C04B 35/80; C04B 41/5042
See application file for complete search history.

(56) References Cited

U.S. PATENT DOCUMENTS

| | | |
|---|---|---|
| 2,674,445 A | 4/1954 | Diehl |
| 3,326,704 A | 6/1967 | Scott et al. |
| 4,623,228 A | 11/1986 | Galasso et al. |
| 4,657,877 A * | 4/1987 | Becher .......... C04B 35/185 264/333 |
| 4,668,579 A | 5/1987 | Strangman et al. |

(Continued)

OTHER PUBLICATIONS

European Search Report for European Application No. 20206017.4; Application Filing Date: Nov. 5, 2020; Date of Action: Apr. 6, 2021; 7 pages.

(Continued)

*Primary Examiner* — Holly Rickman
*Assistant Examiner* — Linda N Chau
(74) *Attorney, Agent, or Firm* — CANTOR COLBURN LLP

(57) ABSTRACT

Disclosed is a coated ceramic fiber including a zirconium interface coating layer deposited on the ceramic fiber, a zirconium dioxide interface coating layer adjacent to the zirconium interface coating layer, and an additional interface coating layer adjacent to the zirconium dioxide interface coating layer, wherein zirconium dioxide interface coating layer forms micro cracks after a crystal structure transformation. The coated ceramic fiber may be included in a composite material having a ceramic matrix.

8 Claims, 1 Drawing Sheet

(56) References Cited

U.S. PATENT DOCUMENTS

| | | | |
|---|---|---|---|
| 5,110,771 A | | 5/1992 | Carpenter et al. |
| 5,275,984 A | * | 1/1994 | Carpenter ............... C04B 41/52 |
| | | | 428/378 |
| 5,284,685 A | | 2/1994 | Rousseau |
| 5,455,106 A | * | 10/1995 | Steffier .............. C04B 35/62897 |
| | | | 442/127 |
| 5,580,643 A | | 12/1996 | Kennedy et al. |
| 5,723,213 A | | 3/1998 | Carpenter et al. |
| 6,194,083 B1 | | 2/2001 | Yasuda et al. |
| 6,322,889 B1 | | 11/2001 | Lara-Curzio et al. |
| 6,361,888 B1 | | 3/2002 | Kriven et al. |
| 6,441,341 B1 | | 8/2002 | Steibel et al. |
| 9,133,541 B2 | | 9/2015 | Lee |
| 12,060,304 B2 | | 8/2024 | Jackson et al. |
| 2006/0163773 A1 | | 7/2006 | Gray |
| 2015/0274979 A1 | | 10/2015 | Lazur |
| 2016/0376691 A1 | | 12/2016 | Wadley et al. |
| 2017/0218779 A1 | | 8/2017 | Luthra et al. |
| 2021/0139381 A1 | | 5/2021 | Jackson et al. |
| 2023/0167030 A1 | | 6/2023 | Jackson et al. |

OTHER PUBLICATIONS

European Search Report for European Application No. 20206025.7; Application Filing Date: Nov. 5, 2020; Date of Action: Apr. 8, 2021, 8 pages.

Piquero et al., "Influence of Carbide Coatings on the Oxidation Behavior of Carbon Fibers", Carbon, vol. 33, No. 4, pp. 455-467, 1995.

Final Office Action issued in U.S. Appl. No. 16/678,852 on Jun. 10, 2022, 8 pages.

Non-Final Office Action issued in U.S. Appl. No. 16/678,852 on Mar. 2, 2022, 8 pages.

US Notice of Allowance issued in U.S. Appl. No. 16/678,852, dated Sep. 30, 2022, pp. 1-12.

US Non-Final Office Action for U.S. Appl. No. 18/161,343, dated May 26, 2023, pp. 1-24.

U.S. Non-Final Office Action corresponding to U.S. Appl. No. 18/595,101; Issue date, Sep. 11, 2024.

* cited by examiner

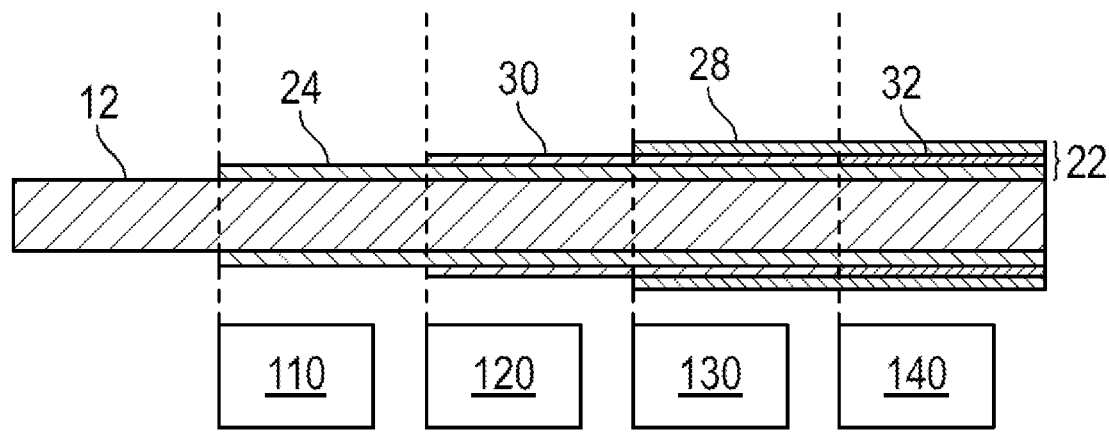

MICROSTRUCTURED FIBER INTERFACE COATINGS FOR COMPOSITES

BACKGROUND

Exemplary embodiments pertain to the art of composites, including ceramic matrix composites.

Composite components are finding increased use into aerospace applications due to their unique, tailorable properties which can result in significant weight savings, increased performance and durability, as well as reductions in specific fuel consumption. In particular, gas turbine engines, such as aircraft engines, operate in severe environments and show significant benefit from incorporation of composite materials. Additionally, other aerospace components, such as brakes, can benefit from incorporating composite materials.

As an example, ceramic matrix composite (CMC) components have desirable high temperature mechanical, physical, and chemical properties which allow gas turbine engines to operate at much higher temperatures with significant weight savings as compared to current engines with super-alloy components. As opposed to traditional, monolithic ceramics, CMCs exhibit a significant amount of damage tolerance when under an applied load. This damage tolerance is due in part to the formation of multiple matrix cracks that aid in the redistribution of stresses to the high strength fibers.

The formation of matrix cracks can extend to the fiber and damage to the fiber may negatively impact the strength of the composite. Interface coatings have been used to address this issue. As CMCs, along with many other composites, are used under harsh environmental conditions improved interface coatings are desired.

BRIEF DESCRIPTION

Disclosed is a coated ceramic fiber including a zirconium interface coating layer deposited on the ceramic fiber, a zirconium dioxide interface coating layer adjacent to the zirconium interface coating layer and an additional interface coating layer adjacent to the zirconium dioxide interface coating layer, wherein zirconium dioxide interface coating layer forms micro cracks after a crystal structure transformation.

In addition to one or more of the features described above, or as an alternative to any of the foregoing embodiments, the zirconium dioxide interface coating layer has a thickness of 50 nanometers (nm) to 10,000 nm, or, 100 to 1,000 nm. Additionally, in some embodiments, the zirconium interface coating layer has a thickness of 1000 nm to 20,000 nm, or, 2,000 to 10,000 nm.

In addition to one or more of the features described above, or as an alternative to any of the foregoing embodiments, the zirconium dioxide interface coating layer has a thickness greater than 200 nm and includes monoclinic zirconium dioxide which forms micro cracks after transforming to tetragonal zirconium dioxide and back to monoclinic zirconium dioxide.

In addition to one or more of the features described above, or as an alternative to any of the foregoing embodiments, the zirconium dioxide interface coating layer has a thickness less than 200 nm and includes tetragonal zirconium dioxide which forms micro cracks after transforming to monoclinic zirconium dioxide.

Also disclosed is a composite material including a ceramic matrix material and a plurality of ceramic fibers embedded within the matrix material. The plurality of fibers includes a multi-layer interface coating. The multi-layer interface coating includes a zirconium interface coating layer deposited on the plurality of fibers, and a zirconium dioxide interface coating layer adjacent to the zirconium interface coating layer and an additional interface coating layer adjacent to the zirconium dioxide interface coating layer, wherein the zirconium dioxide interface coating layer forms micro cracks after a crystal structure transformation.

In addition to one or more of the features described above, or as an alternative to any of the foregoing embodiments, the zirconium dioxide interface coating layer has a thickness greater than 200 nm and includes monoclinic zirconium dioxide which forms micro cracks after transforming to tetragonal zirconium dioxide and back to monoclinic zirconium dioxide.

In addition to one or more of the features described above, or as an alternative to any of the foregoing embodiments, the zirconium dioxide interface coating layer has a thickness less than 200 nm and includes tetragonal zirconium dioxide which forms micro cracks after transforming to monoclinic zirconium dioxide.

In addition to one or more of the features described above, or as an alternative to any of the foregoing embodiments, the zirconium dioxide interface coating layer has a thickness of 50 nanometers (nm) to 10,000 nm, or, 100 to 1,000 nm. Additionally, in some embodiments, the zirconium interface coating layer has a thickness of 1000 nm to 20,000 nm, or, 2,000 to 10,000 nm.

In addition to one or more of the features described above, or as an alternative to any of the foregoing embodiments, the additional interface coating layer can have the same composition as the zirconium interface coating layer. Alternatively, the additional interface coating layer can have a composition different from the zirconium interface coating layer.

Also disclosed is a method for forming a multi-layer interface coating onto a ceramic fiber including depositing a zirconium interface coating layer onto the ceramic fiber, oxidizing a portion of the zirconium interface coating layer to form a zirconium dioxide interface coating layer, depositing an additional interface coating layer on the zirconium dioxide interface coating layer and heat treating the multi-layer coating such that the zirconium dioxide interface coating layer forms micro cracks after a crystal structure transformation.

In addition to one or more of the features described above, or as an alternative to any of the foregoing embodiments, the zirconium dioxide interface coating layer has a thickness greater than 200 nm and includes monoclinic zirconium dioxide which forms micro cracks after transforming to tetragonal zirconium dioxide and back to monoclinic zirconium dioxide.

In addition to one or more of the features described above, or as an alternative to any of the foregoing embodiments, the zirconium dioxide interface coating layer has a thickness less than 200 nm and includes tetragonal zirconium dioxide which forms micro cracks after transforming to monoclinic zirconium dioxide.

BRIEF DESCRIPTION OF THE DRAWINGS

The following descriptions should not be considered limiting in any way. With reference to the accompanying drawing, like elements are numbered alike:

The FIGURE shows a representative interface coating and method of making.

DETAILED DESCRIPTION

A detailed description of one or more embodiments of the disclosed coated fiber and method are presented herein by way of exemplification and not limitation with reference to the FIGURE.

Composites exhibit a significant amount of damage tolerance when under an applied load. In ceramic matrix composites (CMC) in particular, this damage tolerance is due to the formation of multiple matrix cracks that aid in the redistribution of stresses. However, the formation of matrix cracks can result in environmental exposure to the fiber and fiber interface coating. The fiber interface coating protects the fiber from the environmental exposure and provides a weak interface to allow for composite behavior.

The multi-layer interface coating described herein provides a weak interface with the fiber to allow for composite behavior and also provides environmental protection. The multiple layers can prevent crack propagation from reaching the fibers and protect the fiber from environmental degradation. In particular, the zirconium dioxide interface coating layer is a crystalline material which goes through a crystal structure transformation under conditions of normal use or heat treatment. The crystal structure transformation results in the presence of micro cracks which can deflect any matrix cracks from reaching the fiber.

Referring now to the FIGURE, a coated ceramic fiber for use in a composite is shown. The coated ceramic fiber includes ceramic fiber 12 and a multi-layer interface coating 22. The multi-layer interface coating 22 as shown includes three coating layers 24, 32 and 28. Exemplary ceramic fiber materials include silicon carbide, carbon, hafnium carbide, zirconium carbide, tantalum carbide, niobium carbide, boron carbide, titanium carbide, hafnium boride, zirconium boride, tantalum boride, niobium boride, titanium boride, aluminum oxide, mullite, and combinations thereof.

The first interface layer 24 includes zirconium. A portion of the first interface layer is oxidized to form an initially formed zirconium dioxide layer 30. The third interface layer 28 (the additional interface layer) may include silicon carbide, zirconium, zirconium boride or a combination thereof.

The first interface layer may have a thickness of 1000 nm to 20,000 nm, or, 2,000 nm to 10,000 nm. The second interface layer may have a thickness of 50 nm to 10,000 nm, or, 100 nm to 1,000 nm. The third interface layer may have a thickness of 1000 nm to 20,000 nm, or, 2000 nm to 10,000 nm.

The first interface layer is deposited on the ceramic fiber by chemical vapor deposition (shown as step 110). The combination of the first interface layer and the ceramic fiber are then heat treated in the presence of oxygen to oxidize a portion of the first interface layer to form an initially formed zirconium dioxide layer 30 (shown as step 120). If the zirconium dioxide layer 30 has a thickness less than 200 nm then the zirconium dioxide crystal structure may be tetragonal and after heating to a temperature greater than or equal to 1000° C. and cooling will transform to a monoclinic crystal structure with micro cracks. If the zirconium dioxide layer 30 has a thickness greater than 200 nm then the crystal structure may be monoclinic which will convert to tetragonal at a temperature greater than or equal to 1000° C. and return to monoclinic with micro cracks upon cooling.

In some embodiments an interdiffusion layer forms between the zirconium interface coating layer and the ceramic fiber.

An additional interface coating layer 28 is deposited on the initially formed zirconium dioxide layer 30 (shown as step 130) after which the fiber with the multilayer coating is subjected to a heat treatment (shown as step 140) to change the crystal structure of the initially formed zirconium dioxide layer. Exemplary additional interface coating layer materials include zirconium, silicon carbide, zirconium boride or combinations thereof. The additional interface coating layer 28 may be deposited by chemical vapor deposition for example although other methods could be employed. Exemplary matrix materials include silicon carbide, aluminum oxide, mullite, cordierite, and combinations thereof.

Exemplary heat treatment temperatures (step 130) are 1250 to 1800° C., or, 1250 to 1400° C. Exemplary times for the heat treatment include 1 minute to 100 hours, or, 10 minutes to 5 hours.

The micro cracks in the zirconium dioxide interface coating layer provide protection to the fiber from matrix cracking by deflecting the cracks into the second interface layer. The first interlayer provides environmental protection to the fiber so the combination of layers results in a composite with more robust properties. The additional interface coating layer protects the micro cracked zirconium oxide interface layer.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. The term "adjacent to" is defined as being in contact with the underlying material. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A coated ceramic fiber comprising:
a zirconium interface coating layer consisting of zirconium metal deposited on the ceramic fiber, a zirconium dioxide interface coating layer directly adjacent to the zirconium interface coating layer, and an additional interface coating layer directly adjacent to the zirconium dioxide interface coating layer, wherein the zirconium dioxide interface coating layer forms micro cracks after a crystal structure transformation;

wherein the additional interface coating layer consists of zirconium and silicon carbide, zirconium boride, or a combination thereof;

wherein the zirconium dioxide interface coating layer has a thickness greater than 200 nm and includes monoclinic zirconium dioxide which forms micro cracks after transforming to tetragonal zirconium dioxide and back to monoclinic zirconium dioxide; or wherein the zirconium dioxide interface coating layer has a thickness less than 200 nm and includes tetragonal zirconium dioxide which forms micro cracks after transforming to monoclinic zirconium dioxide.

2. The coated ceramic fiber of claim 1, wherein the zirconium interface coating layer has a thickness of 1000 nm to 20,000 nm.

3. The coated ceramic fiber of claim 1, wherein the additional interface coating layer has the same composition as the zirconium interface coating layer.

4. The coated ceramic fiber of claim 1, wherein the additional interface coating layer has a different composition from the zirconium interface coating layer.

5. A composite material comprising a ceramic matrix material and a plurality of ceramic fibers embedded within the ceramic matrix material wherein the plurality of ceramic fibers comprises a multi-layer interface coating and the multi-layer interface coating comprises a zirconium interface coating layer consisting of zirconium metal deposited on the plurality of ceramic fibers, a zirconium dioxide interface coating layer directly adjacent to the zirconium interface coating layer and an additional interface coating layer directly adjacent to the zirconium dioxide interface coating layer, wherein the zirconium dioxide interface coating layer forms micro cracks after a crystal structure transformation;

wherein the additional interface coating layer includes silicon carbide, zirconium boride, or a combination thereof;

wherein the ceramic matrix material includes mullite, cordierite, or a combination thereof;

wherein the zirconium dioxide interface coating layer has a thickness greater than 200 nm and includes monoclinic zirconium dioxide which forms micro cracks after transforming to tetragonal zirconium dioxide and back to monoclinic zirconium dioxide; or wherein the zirconium dioxide interface coating layer has a thickness less than 200 nm and includes tetragonal zirconium dioxide which forms micro cracks after transforming to monoclinic zirconium dioxide.

6. The composite material of claim 5, wherein the zirconium interface coating layer has a thickness of 1000 nm to 20,000 nm.

7. The coated ceramic fiber of claim 5, wherein the additional interface coating layer has the same composition as the zirconium interface coating layer.

8. The coated ceramic fiber of claim 5, wherein the additional interface coating layer has a different composition from the zirconium interface coating layer.

\* \* \* \* \*